(12) United States Patent
Alexander et al.

(10) Patent No.: US 7,276,681 B2
(45) Date of Patent: Oct. 2, 2007

(54) ON-BOARD LIGHT SOURCE BASED GAIN CORRECTION FOR SEMI-ACTIVE LASER SEEKERS

(75) Inventors: William C. Alexander, Spicewood, TX (US); David Schorr, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/139,098

(22) Filed: May 26, 2005

(65) Prior Publication Data

US 2006/0266919 A1 Nov. 30, 2006

(51) Int. Cl.
*G01C 21/02* (2006.01)
*G01C 21/24* (2006.01)
*G01J 1/20* (2006.01)
*G06M 7/00* (2006.01)
*H01J 40/14* (2006.01)

(52) U.S. Cl. .............................. 250/203.6; 250/203.1; 250/221; 250/222.1; 244/3.13

(58) Field of Classification Search ............. 250/203.1, 250/203.2, 203.6, 221, 222.1, 342; 356/4.01, 356/141.1; 244/3.13, 3.16
See application file for complete search history.

(56) References Cited

U.S. PATENT DOCUMENTS

| | | | |
|---|---|---|---|
| 6,262,800 B1 * | 7/2001 | Minor | ................... 356/139.07 |
| 6,717,170 B2 * | 4/2004 | Worner | ................... 250/559.38 |
| 6,864,965 B2 * | 3/2005 | DeFlumere | ................ 356/4.01 |
| 7,185,845 B1 * | 3/2007 | Hartman et al. | ........... 244/3.16 |

* cited by examiner

*Primary Examiner*—Georgia Epps
*Assistant Examiner*—Patrick J. Lee
(74) *Attorney, Agent, or Firm*—Locke Liddell & Sapp LLP; Matthew G. Reeves

(57) ABSTRACT

The invention provides a method and apparatus for correcting for gain changes in detectors in a guided vehicle. In one version of the invention, an on board light source is used to generate a reference set of detector gains, which are stored in computer memory. The on board light source is then pulsed at subsequent times and the signals generated by the detectors are compared to the reference set of detector gains to determine whether any gains have changed.

14 Claims, 3 Drawing Sheets

ON-BOARD LIGHT SOURCE BASED GAIN CORRECTION FOR SEMI-ACTIVE LASER SEEKERS

STATEMENT OF GOVERNMENT INTEREST

The invention claimed in this patent application was made with U.S. Government support under contract No. DAAH01-03-C-0100 awarded by the U.S. Army. The U.S. Government has certain rights in the invention.

TECHNICAL FIELD

This invention relates generally to guidance systems in self-guiding vehicles. In particular, the invention relates to guided missile systems using lasers to direct guided missiles to their targets.

BACKGROUND OF THE INVENTION

Laser guidance systems for controlling guided missiles or other remotely controlled vehicles are known in the art. For example, in a conventional laser guided missile, a laser is used to illuminate the desired target. The laser may be mounted on the missile itself, or may be directed at the target from a separate ground or air-based source. In either case, the laser energy is reflected from the target and detected by the missile. The missile then uses this energy to determine the direction to the target and navigate towards it.

To detect the reflected laser energy, the missile typically has a number of apertures arranged in its nose or other areas on the missile surface. Lenses or other optical components are often located in the apertures to assist in the collection to of the reflected laser energy. The reflected laser energy received at the apertures is then directed into fiber optic cables that transmit the reflected laser energy into detectors mounted within the missile. These detectors convert the laser energy into electrical signals that are then passed to the missile's onboard computer system. The computer system then uses these signals to determine the direction to the target and guide the missile accordingly.

The amount of energy in the electrical signals is, of course, proportional to the corresponding amount of laser energy received on the fiber optic cables. Because the fiber optic cables correspond to different apertures on the missile, the amount of energy in the fiber optic cables will vary depending on the angle from which the energy was received. Therefore, by knowing the arrangement of the apertures, and which apertures correspond to particular fiber optic cables, it is possible to compare the relative amount of energy from each of the fiber optic cables to determine the direction from which the received laser energy is coming from.

Therefore, for the guidance computer to accurately determine the direction to the target, it is important that the signals provided by the detectors accurately reflect the relative amount of laser energy received at their respective apertures. But the gain or responsivity is not necessarily uniform between detectors. Typically, detectors are manufactured having a specified tolerance or variation in their gain or responsivity to laser energy. Therefore, at the factory these variations are normally measured and stored in the memory of the missile's computer system for each detector. This allows the missile's computer system to compensate for the variations in detector responsivity when it compares the relative amounts of energy received at the apertures. However, the variation in detector responsivity may also vary with such factors as temperature or the voltage that is applied to the detectors. This leads to errors in determining the relative amount of energy received at each aperture on the missile, which, in turn leads to errors in navigation.

SUMMARY OF THE INVENTION

In one embodiment, the invention provides a method and apparatus for detecting and correcting for relative gain variations among the channels of a semi-active laser seeker ("SALS"). The SALS relies on known gain relationships among the various channels to accurately locate the target direction. Because temperature changes and other effects may change the relative gains between channels, rendering the accuracy and/or linearity of the SALS inadequate, one embodiment of the invention allows for a suitable control system to sense and correct for these relative gain changes, thus restoring accuracy and linearity to the SALS.

In one particular embodiment, a fixed, on-board light source ("OBLS") is added to the basic: multi-channel SAL seeker. This light source puts a certain amount of light into each of the multiple detectors of the SALS. Since the light source is fixed, the relative amount of light from the OBLS is constant from channel to channel. The absolute amount of light may change without any negative effect. The light from the OBLS may be distributed among the detectors by any suitable means, including fiber optics, free space or optical elements common to all detectors. In a further embodiment to the invention, the OBLS is an on-board light emitting diode ("LED").

In another version of the invention, the OBLS is used to correct for gain (or responsivity) changes among the channels. The OBLS is first pulsed to generate a light pulse to each detector during an initial calibration. The resulting peak channel amplitudes from the detectors are ratioed to each other and stored as a reference. During later operations of the SALS, the OBLS is again pulsed and the resulting peak amplitudes are ratioed to each other. These new ratios are compared to the reference ratios, with different ratios indicating that at least some of the channels have changed their response relative to other channels. The ratios of the ratios are then used to correct for these responsivity changes.

DRAWINGS

BRIEF DESCRIPTION OF EMBODIMENTS OF THE INVENTION

Figure 1:
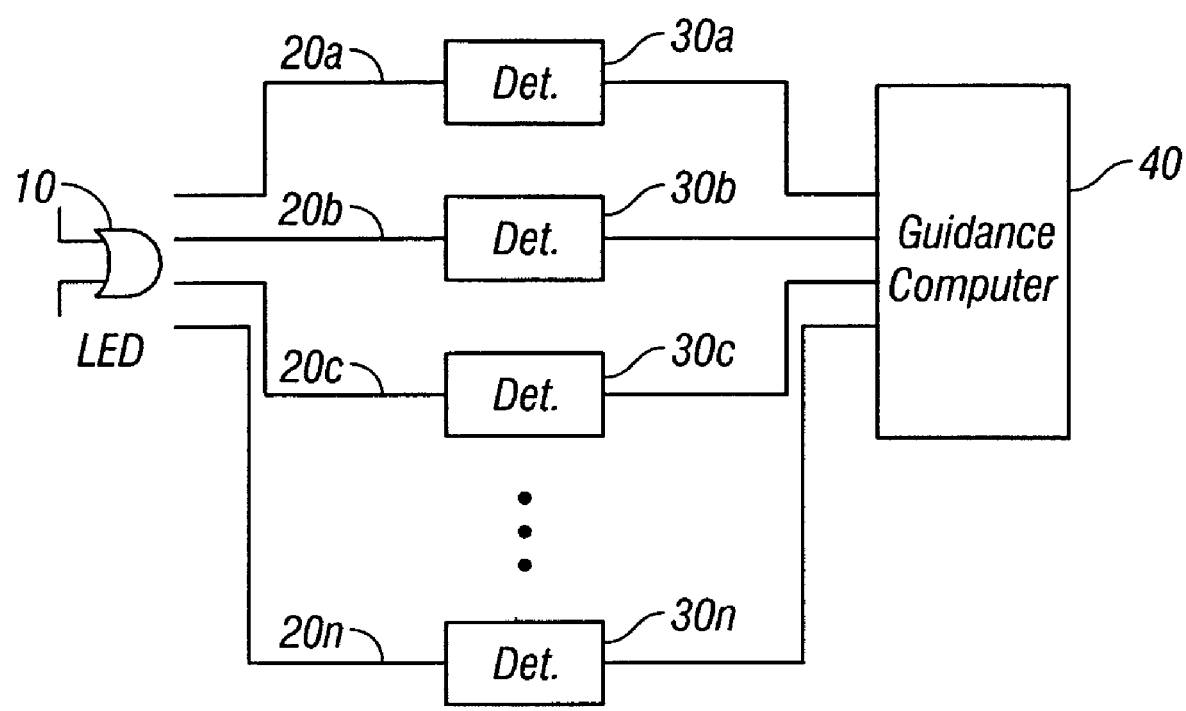
FIG. 1 is a block diagram showing an embodiment on an onboard laser light pulsing system according to the embodiment invention.
Figure 3:
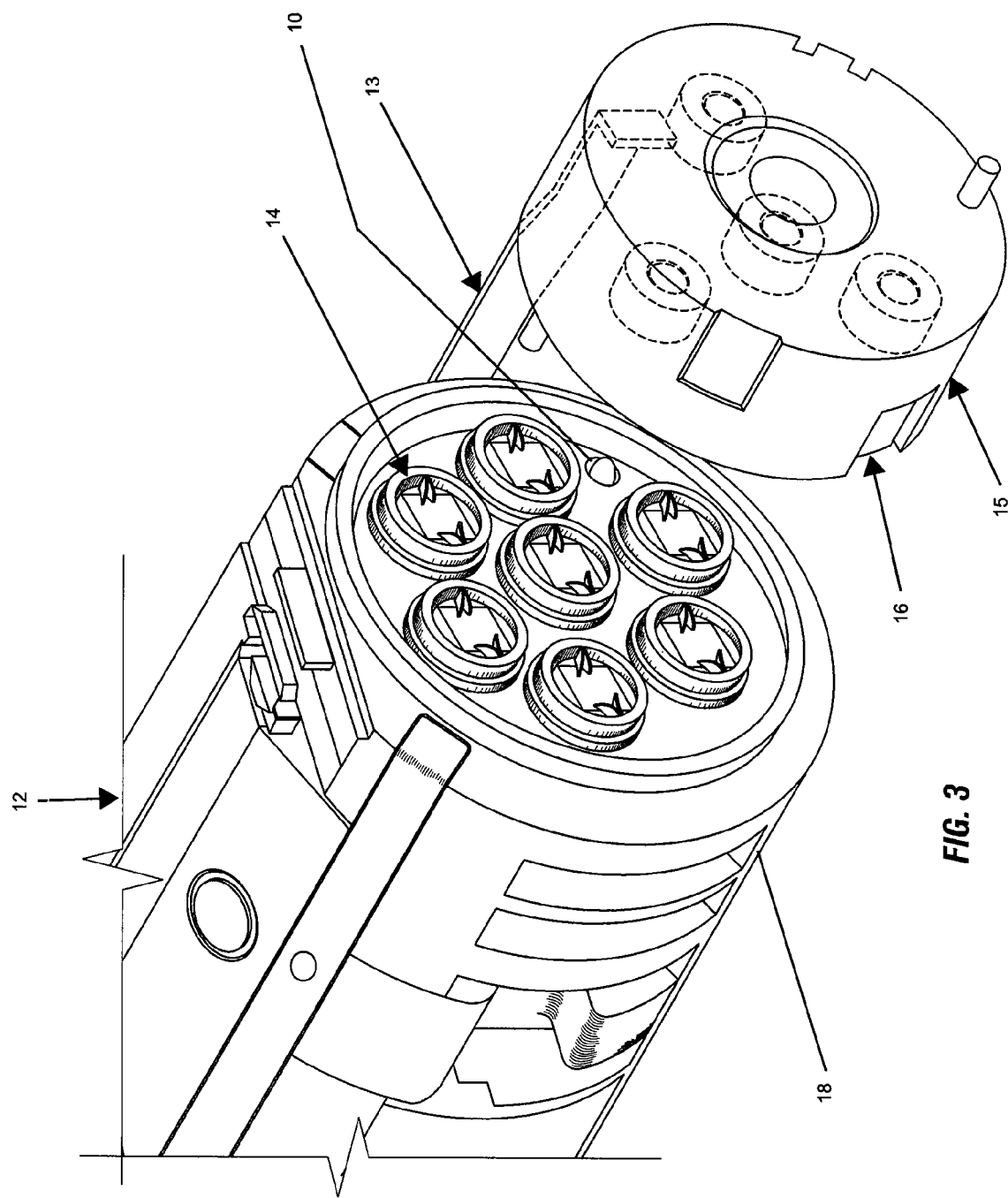
FIG. 3 depicts the calibration LED mounted on board a guided missile according to an embodiment of the invention.

FIG. 1 shows a block diagram of one embodiment to the invention. In this embodiment the OBLS is an LED 10 which is used to calibrate the responsivity of the detectors. The calibration LED 10 is preferably mounted inside the missile, where it radiates light energy onto a plurality of optical fibers 20a-20n. FIG. 3 depicts the seeker electronics section 12 of a missile according to an embodiment of the invention. In this embodiment, the calibration LED 10 is mounted in the detector board 18 of the seeker electronics 12. Also mounted on the detector board 18 are seven avalanche photodiodes ("APD") 14, which receive the incoming laser radiation from an external laser designator as well as light from the calibration LED 10. The missile is also provided with back lens plates 16, which contain lenses 15. In one particularly advantageous embodiment the lenses molded into the lens plates for durability. The missile's optical system also includes a front lens plate (not shown), which receives light from the external laser designator and passes through an optical filter (not shown). The light is then passed to the back lens plate 16, which converges it onto the APDs 14. The back lens plate 16 is coupled to the detector electronics section of the missile by a retention clip 13.

The LED 10 is surface mounted to the detector board 18. Light from LED 10 is passed through a diffuser molded into the back lens plate 16 and then into the back lens plate 16 itself so that when LED 10 is pulsed light is diffused in the space between the back lens plate 16 and the detector board 18. Because the light is diffused the missile will be less sensitive to vibration.

Preferably, the calibration LED 10 has the same pulse width and wavelength as the laser radiation from the laser designator that will be used to illuminate the target. This way, the response from the detectors will most closely match the response they would give on receiving a laser pulse. In conventional systems, the laser pulse widths from the laser designator typically range between 15 and 30 nanoseconds, and the wavelengths are about 1064 nanometers. And the pulse repetition interval is typically around 50 ms. In this embodiment, LED 10 would typically be a laser diode that generates light at 1064 nm.

Other embodiments, however, are certainly possible, in which the OBLS is not matched to the illuminating laser. For example, a conventional, surface mount infrared LED producing light at a wavelength of 950 nm is also useful. Still other light sources will occur to those of skill in the art that can be for the OBLS. This does not present a problem as long as the detector gain is not overly sensitive to the pulse width or wavelength such that the accuracy of the system would deteriorate below the desired specifications. Of course, the accuracy of the system is a matter of design choice, and it is within the abilities of those of skill in the art to match the appropriate LEDs, lasers, and detectors in order to assemble a system that will meet whatever specifications are desired.

In another version of the invention, the LED 10 directs light directly onto the optical fibers 20a-20n, as shown. Of course, other embodiments are certainly possible in which lenses or other optics are provided as an interface between the calibration LED 10 and the optical fibers 20a-20n as a matter of design choice.

The optical fibers 20a-20n are connected to detectors 30a-30n. Detectors 30a-30n are conventional detectors used in detecting laser light, such as avalanche photodiodes, photodiodes, phototransistors, or any other suitable light detectors, which will occur to those of skill in the art in view of the teachings herein. The detectors convert the laser energy received on optical fibers into an electrical signal that it then passes to the guidance system 40.

Of course, persons of skill in the art will recognize that in an actual working system there would likely be other components such as amplifiers, filters, analog digital converters,, and so forth depending on the specific design choices made by the manufacturer. Therefore, FIG. 1 has been simplified for purposes of illustrating the operation of embodiments of the inventions.

In one version of the invention, during manufacture or at some other initial stage, the calibration LED 10 is pulsed to illuminate the fiber optic cables 20a-20n. The light energy from LED 10 is transmitted through the fiber optic cables to detectors 30a-30n where it is converted to electrical energy and passed to guidance system 40. The amount of energy received by each detector is recorded and stored in the computer memory of guidance system 40. This allows the guidance system 40 to calculate reference ratios for each of the detectors. Once the reference ratios are calculated and stored, if there is any change of the responsivity of any of the detectors, this change can be detected for by guidance system 40 by simply pulsing the calibration LED 10 again and comparing the new ratios from the detectors from the reference ratios stored in memory. The ratio of these ratios may then be used to correct for any relative responsivity changes in the detectors. The ability to detect and correct for variations in gain from the detectors, particularly since conventional detectors may have a gain variation of up to 4-to-1.

While the invention is useful in static testing, it is not limited to static testing and is particularly suited to continually update and improve the navigation of a remotely controlled vehicle in real time. In one advantageous embodiment, for example, when the invention is applied to a guided missile the missile uses the calibration LED 10 in flight to continually update its navigation information. When the missile is launched, the calibration LED 10 is pulsed to send light energy to the detectors in between each light pulse from the incoming laser-energy received at the apertures. The guidance system 40 then uses the newest information about the responsivities of the detectors 30 in determining the direction to the target. In this way, the missile can compensate for changes in temperature, linearity, or other parameters that could affect the responsivity or gains of the detectors in flight, greatly improving the missile's accuracy.

Figure 2:
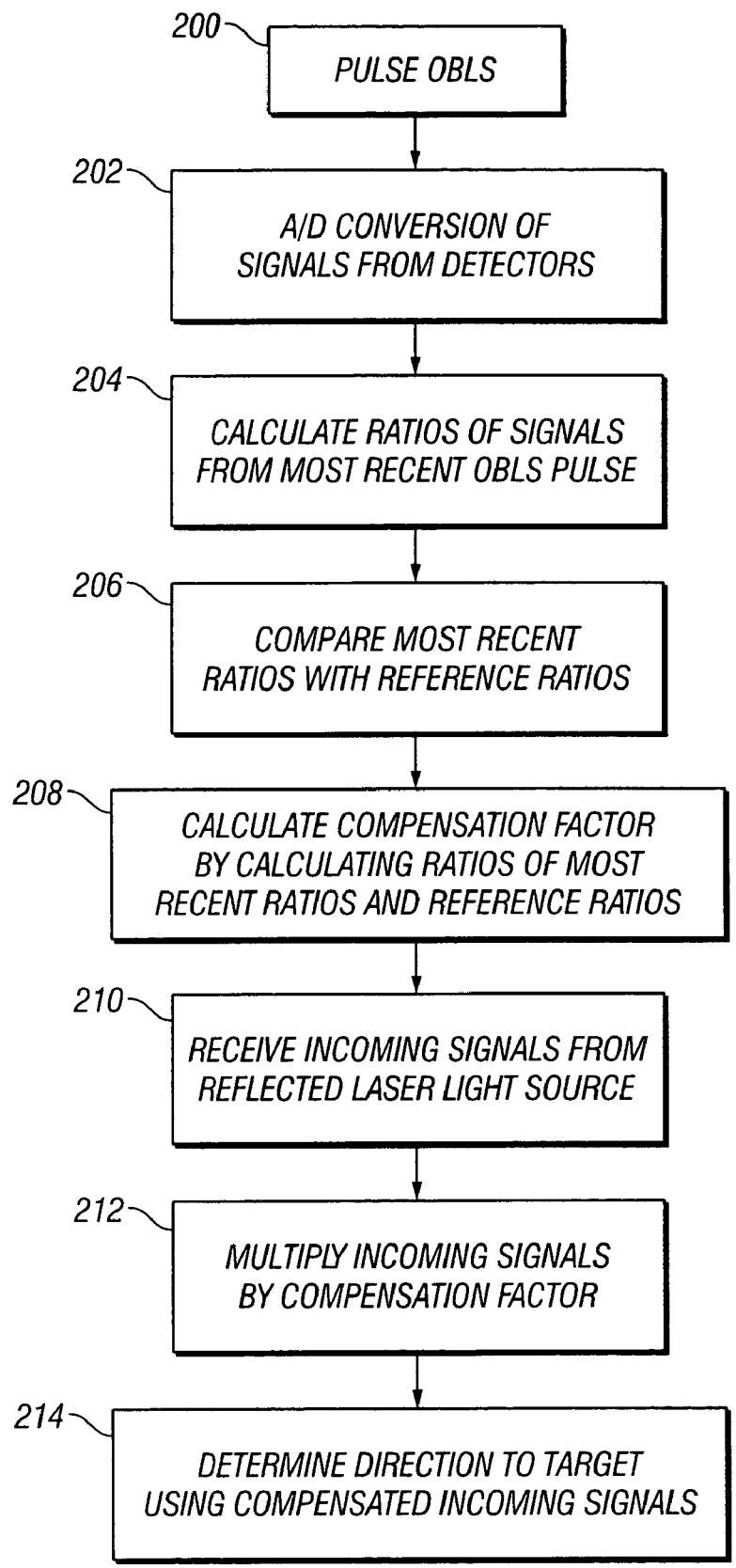
FIG. 2 is a flow chart illustrating an embodiment of the invention using the OBLS to compensate for changes in detector gain in flight.

FIG. 2 is a flow chart according to an embodiment to the invention that illustrates its real time application in connection with a guided missile. In step 200, the onboard light source is pulsed in order to send a light signal to the detectors. The detectors, in turn, generate electrical signals proportionate to the amount of light energy received. In step 202, a computer on board the missile performs an analog to digital ("A/D") conversion of the signals from the detectors is to convert the amplitude of the electrical signals into digital information. It will be understood that the missile detectors have been previously calibrated as described earlier to determine reference ratios for the responsivities of the detectors and this information is stored in the guidance system computer memory or some other computer memory on board the missile.

In step 204 the missile's computer then calculates the ratios of the signals generated by the detectors in response to the most recent OBLS pulse. A ratio will be determined that compares each detector to every other detector in the plurality. Thus, in one exemplary embodiment using an array of 7 detectors, a ratio is calculated comparing the outputs of detectors 1 and 2, 1 and 3, and so forth, through 1 and 7. In step 206 the computer then compares the ratios determined in response to this most recent OBLS pulse with the reference ratios stored in memory. In step 208 the computer than calculates a compensation factor by calculating the ratios determined in response to the most recent OBLS pulse to the reference ratios, i.e., a ratio of the ratios. Of course, if there has been no change in any of the detectors, the ratio of the ratios for the detectors, and accordingly, the compensation factor, will be 1. Otherwise, the compensation factor will depend on the amount of change in gain of the detectors involved. It will also be understood that there will be multiple compensation factors, each one associated with a comparison between any two of the detectors.

The missile then receives an incoming pulse from the target in step 210. The incoming signals are transmitted to the detectors, converted to electrical energy and then passed through an A/D conversion as described above. In step 212 the incoming signals are then multiplied by the compensation factors calculated in step 208.

The compensated signals are then passed to the guidance system computer where, in step 214, it determines the direction to the target using compensated signals. Suitable methods for determining the direction to the target based upon incoming signals are well known in the art, for example, U.S. Pat. No. 5,784,156 to Nicholson, or U.S. Pat. Nos. 4,674,874 or 4,682,024 to Halldorsson, incorporated by reference herein.

To further illustrate the operation of the invention, again with reference to FIG. 1, it is assumed that detectors 30$a$ is initially more responsive to received energy detector 30 by a factor of 2-to-1. This information is stored in the guidance system of the missile. Later, after the missile is in the field, for reasons that may be due to temperature changes, aging of components, or other factors, testing the missile with the calibration LED 10 reveals that detector 30$a$ is now only 1.5 times as responsive as detector 30$b$. The guidance system 40 then compensates for this change in the detector. 30$a$'s responsivity by multiplying the signal received from detector 30$a$ by a factor of 2/1.5 or 1.333, in determining the ratio of signals received by detector 30$a$ to 30$b$. Therefore, in an embodiment in which a signal from 30$a$ and 30$b$ are passed through an analog to digital converter before being sent to the guidance control 40, and, assuming each detector was showing a value of 1,000 counts, the guidance system 40 would multiply detector 30$a$'s count by 1.3333 resulting in 1333.3 counts. This figure is used by Guidance System 40 to determine the ratio of reflected energy received by these detectors, rather than the 1000 counts detector 30$a$ is actually reading. In this way, the guidance system 40 compensates for the change in responsivity of 30$a$ in determining the direction to the target.

It will be recognized by those of skill in the art that it is not necessary that calibration LED 10 direct an equal amount of light to each of detectors 30. It is important only that the relative amount of energy received on each detector is recorded by guidance system 40 for future reference. Moreover, in another embodiment invention, it will be recognized that it is not required that calibration LED 10 even provide the same amount of energy on each calibration as long as the relative responsivities of the detectors 30 are not sensitive to the amount of light received from calibration LED 10.

Those of skill in the art, will of course, recognize that other embodiments are possible. For example, calibration LED could be used less frequently than after each received pulse of the missile in flight, if desired. It will also be understood that the invention can be easily adapted to analog circuitry. Further, it is immaterial whether the reference information is stored directly as ratio information or whether it is stored as amplitude information from which ratios can be calculated by on board computer systems. Moreover, it will be recognized that the invention applies not only to guided missiles but also to any type of device that uses reflected energy to determine a director to a target. Still other embodiments will occur to those of ordinary skill in the art.

We claim:
1. A vehicle guidance system comprising:
   a calibration light source on board the vehicle;
   a plurality of detectors that receive light from the calibration light source and from light reflected by a target and generate electrical signals responsive to the amount of light received;
   a memory on board the vehicle containing reference data representing an initial set of gains for the plurality of detectors;
   pulse circuitry that causes the calibration light source to generate a calibration light pulse, which is transmitted to the plurality of detectors; and
   a computer processor that compares the electrical signals generated in response to the calibration light pulse with the reference data to determine whether there has been a change in the gain for any of the plurality of detectors.

2. A vehicle guidance system as in claim 1 wherein the calibration light source is matched to the same wavelength as the light reflected by the target.

3. A vehicle guidance system as in claim 1 wherein the plurality of detectors are photodiodes.

4. A method for guiding a vehicle to a target comprising:
   pulsing light onto a plurality of detectors from an on-board light source;
   generating an electrical signal from each of the plurality of detectors that is proportional to the amount of light that the detector received;
   comparing the electrical signals to reference values corresponding to each of the detectors to determine ratios between each electrical signal and each corresponding reference value;
   receiving light reflected from a target;
   transmitting the received light to the plurality of detectors and generating a received electrical signal for each of the plurality of detectors;
   compensating the received electrical signals proportional to the ratios; and determining the direction to the target from the compensated electrical signals.

5. A method as in claim 4 wherein pulsing light onto a plurality of detectors further comprises passing the light through a diffuser.

6. A method as in claim 4 further comprising converting the electrical signals from each of the plurality of detectors into digital information.

7. A method as in claim 6 further comprising calculating a compensation factor for multiplication with the digital information.

8. A method for guiding a missile to a target comprising:
   transmitting a first light pulse from a calibration light source located on board the missile to a plurality of detectors, wherein each detector generates an electrical signal that is proportional to the amount of light it received from the first light pulse;
   transmitting the electrical signals from the detectors in response to the first light pulse to a guidance system computer having a memory;
   storing a plurality of reference values in memory representative of the electrical signals each detector generated in response to the transmission of the first light pulse;
   transmitting a second light pulse from the calibration light source to the plurality of detectors;
   transmitting the electrical signals generated by the detectors in response to the second light pulse to the guidance system computer;

comparing the electrical signals generated by the second light pulse to the reference values in memory to determine any changes in gain among the detectors;

receiving a reflected light pulse from a target and transmitting the reflected light pulse to the detectors, wherein each detector generates an electrical signal that is proportional to the amount of light received from the reflected light pulse;

transmitting the electrical signals generated by the reflected light pulse to the guidance system computer, which corrects the electrical signals for any changes in gain among the detectors; and determining the direction to the target based on the corrected electrical signals generated in response to the reflected light pulse.

9. A method as in claim 8 wherein comparing the electrical signals generated by the second light pulse comprises determining a ratio of the amplitudes of electrical signals generated by the second light pulse to the references values in memory.

10. A method as in claim 9 further comprising determining a compensation factor and using the compensation factor to modify a digital value representing the amplitudes of the electrical signals generated in response to the reflected light pulse.

11. A laser guided missile comprising:
a detector board having a plurality of detectors mounted thereon;
an on-board light source that can transmit light to the detectors;
a lens plate having at least one lens for converging light received from an external light source onto the plurality of detectors;
analog to digital conversion circuitry that converts analog electrical signals received from the detectors into digital data; and
an electronic memory that stores reference data generated by pulsing the on-board light source onto the detectors.

12. A laser guided missile as in claim 11 further comprising: an electronic circuit for pulsing the on-board light source while the missile is in flight.

13. A laser guided missile as in claim 12 further comprising a computer for comparing digital information generated by pulsing the on-board light source onto the detectors with the reference values and determining at least one ratio.

14. A laser guided missile as in claim 13 further comprising a computer for multiplying digital information generated by directing received light onto the detectors by the at least one ratio and determining the direction to the target.

* * * * *